Figure 1:
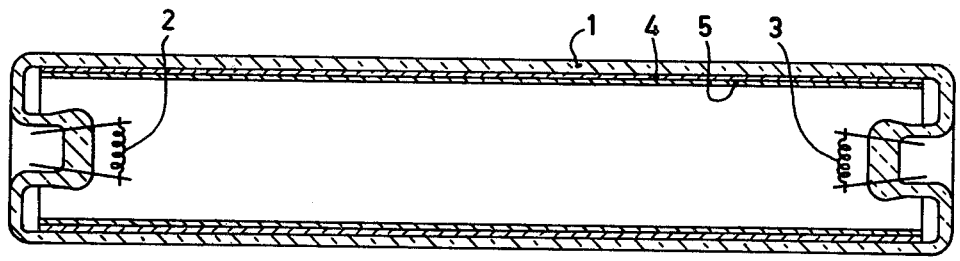

United States Patent [19]

Wanmaker, deceased et al.

[11] 4,069,441
[45] Jan. 17, 1978

[54] ELECTRIC GAS DISCHARGE LAMP HAVING TWO SUPERPOSED LUMINESCENT LAYERS

[75] Inventors: Willem Lambertus Wanmaker, deceased, late of Eindhoven, Netherlands, by Tomas Lammert Willem Reininga, administrator; Lambertus Wilhelmus Johannes Manders; Johannes Wilhelmus ter Vrugt, both of Eindhoven, Netherlands

[73] Assignee: U.S. Philips Corporation, New York, N.Y.

[21] Appl. No.: 721,287

[22] Filed: Sept. 8, 1976

Related U.S. Application Data

[63] Continuation of Ser. No. 574,348, May 6, 1975, abandoned.

[30] Foreign Application Priority Data

May 6, 1974 Netherlands .................. 7406035

[51] Int. Cl.$^2$ .................. H01J 61/46; H01J 61/48
[52] U.S. Cl. .................................. 313/487
[58] Field of Search ............... 313/485, 486, 487, 489, 313/493; 350/1

[56] References Cited

U.S. PATENT DOCUMENTS

| 2,290,186 | 7/1942 | Holman et al. | 313/486 |
|---|---|---|---|
| 2,299,720 | 10/1942 | Holman | 313/489 |
| 2,892,956 | 6/1959 | Vodicka | 313/489 |
| 3,957,675 | 5/1976 | Schutt | 350/1 |

*Primary Examiner*—Palmer C. Demeo
*Attorney, Agent, or Firm*—Frank R. Trifari; Robert S. Smith

[57] ABSTRACT

A fluorescent lamp requiring a smaller amount of luminescent material than is normally required. The luminescent layer is composed of component layers, the component layers which do not face the discharge contain a mixture of the luminescent material and a white pigment which reflects ultraviolet radiation.

8 Claims, 2 Drawing Figures

ELECTRIC GAS DISCHARGE LAMP HAVING TWO SUPERPOSED LUMINESCENT LAYERS

This is a continuation of application Ser. No. 574,348, filed May 6, 1975, now abandoned.

The invention relates to an electric gas discharge lamp in which radiant energy emitted by the gas discharge is converted into long-wave length radiation by means of a granular luminescent material provided on a substrate. The invention relates particular to gas discharge lamps in which the discharge is produced in a low-pressure or high-pressure mercury vapour atmosphere. In the former type of lamps the luminescent material is generally disposed on the inner surface of the wall of the discharge space proper; in the latter type of lamps it usually is disposed on a bulb which surrounds the discharge tube proper.

In lamps of the above mentioned type a high efficiency is aimed at, that is to say the aim is to convert the greatest possible portion of the electric energy supplied to the lamp into the desired radiation. This efficiency depends upon many factors including the composition and the amount of the luminescent material.

Because the luminescent material, especially if it comprises substances which are expensive, for example because they contain expensive elements such as rare earth elements, forms a comparatively large part of the cost of the lamp, another aim is to reduce the amount of luminescent material required to a minimum. In most cases the said two requirements are not simply compatible without special measures. Hence special steps have been taken to reduce the amount of luminescent material without diminishing the efficiency. For example, British patent specification No. 603,326 describes that the amount of luminescent material can be reduced by locating a material highly reflective to ultraviolet radiation between the luminescent material and its support. This reflecting layer reflects ultraviolet radiation which is not directly converted by the luminescent layer to the latter layer in which it then is converted into longer-wavelength radiation. As a result the amount of luminescent material in the luminescent layer can be reduced, that is to say the thickness of this layer may be smaller than if no reflecting layer were used. It is true that thus an additional material is required, i.e. the material reflecting the ultraviolet radiation, and that two layers are to be applied, but nevertheless a saving in the overall cost of the lamp is obtainable, because such a layer reflecting ultraviolet radiation may consist of a cheap material, for example magnesium oxide.

An electric gas discharge lamp according to the invention has a layer of a granular luminescent material located on that surface of a support which faces the discharge, and is characterized in that this layer comprises at least two superposed component layers which, with the exception of the component layer facing the discharge, comprise a mixture of the luminescent material and a white material which is nonluminescent and has an absorption for ultraviolet radiation of a wavelength above 240 nm which is less than 20% of the absorption of this radiation by that component of the luminescent material which has the smallest absorption for this radiation, the ratio of the amount of white material to the amount of luminescent material in a component layer increasing with the distance of this layer from the discharge.

The difference from the gas discharge lamp as described in the British patent specification No. 603,326 is that between the luminescent layer facing the discharge and the support at least one layer is provided which does not consist only of a material which highly reflects ultraviolet radiation but consists of such a material mixed with a luminescent material.

Calculations and experiments have shown that if the above requirement in respect of the absorption of ultraviolet radiation by the white material is satisfied, while the radiation output of the lamp is maintained equal or in some cases even is increased, a greater reduction of the cost of the lamp is obtainable than when using the step according to the said British patent specification, because a smaller amount of luminescent material and/or of material reflecting ultraviolet radiation is required. This will be proved hereinafter with reference to examples and drawings.

The white material is a material such that its absorption for visible radiation is very slight. Obviously this is not identical with low absorption for ultraviolet radiation. Conversely, however, a material having a small absorption for ultraviolet radiation has an absorption for visible radiation which is at least as small.

It is known to provide low-pressure mercury vapour discharge lamps with a luminescent screen which consists of a luminescent material mixed with an additional material, such as silicon dioxide or aluminium oxide. The latter substances are added in small amounts to improve the adherence.

According to the invention preferably a white material is chosen such that the absorption for ultraviolet radiation having a wavelength of more than 240 nm is less than 10% of the absorption of this radiation by that luminescent material which has the smallest absorption for this radiation.

The use of the principle according to the invention is of particular importance when the luminescent layer facing the discharge converts between 80 and 99% of the ultraviolet radiation generated directly by the discharge. Such a conversion percentage, which naturally is desirable to realise a lamp having a high radiation output, is obtainable by using materials having a very high ultraviolet absorption; thus the layer may be very thin and hence cheap. However, such a very thin layer still transmits a certain amount of ultraviolet radiation, because owing to the granular structure it is not possible to make a completely tight layer.

If the layer facing the discharge does not have a very high ultraviolet absorption, it will have to be thicker. However, to enable such a layer to absorb a very high amount of ultraviolet radiation it would have to be very thick. Such a thick layer provides great difficulty with respect to adherence and obviously will be expensive. Hence practical limits are set to the thickness of the layer; however, as a result a given amount of ultraviolet radiation is transmitted. According to the invention, in the layer or layers not adjoining the discharge space part of the transmitted ultraviolet radiation is converted into the desired radiation while another part is reflected back by the white material towards the discharge and inter alia is converted into the desired radiation by the layer facing the discharge.

Because the amount of ultraviolet radiation available for conversion into the desired radiation decreases with the distance from the discharge, the ratio of the amount of white material to the amount of luminescent material must increase in the component layers more remote from the discharge. In theory this ratio would have to increase continuously in the direction from the discharge to the support. In practice, however, this is difficult to obtain and hence component layers will be used. In general, even two component layers only will be used, one containing white material reflecting ultraviolet radiation and the other not containing such material, for providing two component layers is a conventional technique in manufacturing fluorescent lamps.

The invention provides maximum effect when the absorption in the component layer facing the discharge lies between 90 and 99%. If the absorption exceeds 99%, the effect of the succeeding component layer or layers can obviously be very slight only.

The grain size of the white material in the component layers influences the reflection of the ultraviolet radiation and the adherence of these layers. Preferably the mean grain size of the white material is smaller than the main grain size of the luminescent material.

The invention is not restricted to lamps intended for emitting visible radiation. It also applies to lamps which emit ultraviolet radiation of a wavelength greater than that of the ultraviolet radiation generated in the discharge. Examples of such lamps are lamps for photochemical processes, such as the hardening of lacquer, the drying of ink and the like. Naturally the invention may also be used for lamps for cosmetic use.

The invention is of particular importance for use in low-pressure mercury vapour discharge lamps in which the layers are located on the inner surface of the glass wall surrounding the discharge space, but it may also be used in high-pressure mercury vapour discharge lamps in which the support is a bulb enclosing the discharge tube proper.

White substances which are particularly suited for applying the principle of the invention are barium sulphate and calcium pyrophosphate. However, good results are also obtainable with magnesium oxide. The mean grain size preferably lies between 1 and 5 microns, because the luminescent materials most commonly used also have such a mean grain size.

Examples of suitable luminescent materials are blue-luminescing barium magnesium aluminate activated with bivalent europium ($Ba_{0.9}Eu_{0.1}^{++}Mg_2Al_{16}O_{27}$), green luminescing magnesium aluminate activated with trivalent cerium and terbium ($Ce_{0.67}^{+++}Tb_{0.33}^{+++}MgAl_{11}O_{19}$) and red luminescing yttrium oxide activated with trivalent europium ($Y_{1.95}Eu_{0.05}^{+++}O_3$). The use of a mixture of these three substances in a low-pressure mercury vapour discharge lamp enables a very high light output and a high-quality colour rendition to be obtained. However, the substances are very expensive because they contain rare earth elements. By using the invention the total amount of these expensive substances contained in the luminescent layer can be reduced.

The component layer facing the discharge may alternatively contain less expensive materials, such as calcium halophosphates, which have slightly lower ultraviolet absorption. As mentioned hereinbefore, in this case also the use of the principle of the invention is advantageous. It is true that the saving is smaller, but the total amount of luminescent material may still be reduced. Apart from the saving in cost this reduction may be of advantage in manufacture, for problems of adherence increase with the thickness of the layers. In addition, the grain size of the substances may be varied within wider limits precisely because the component layer facing the discharge may be thinner.

Figure 2:
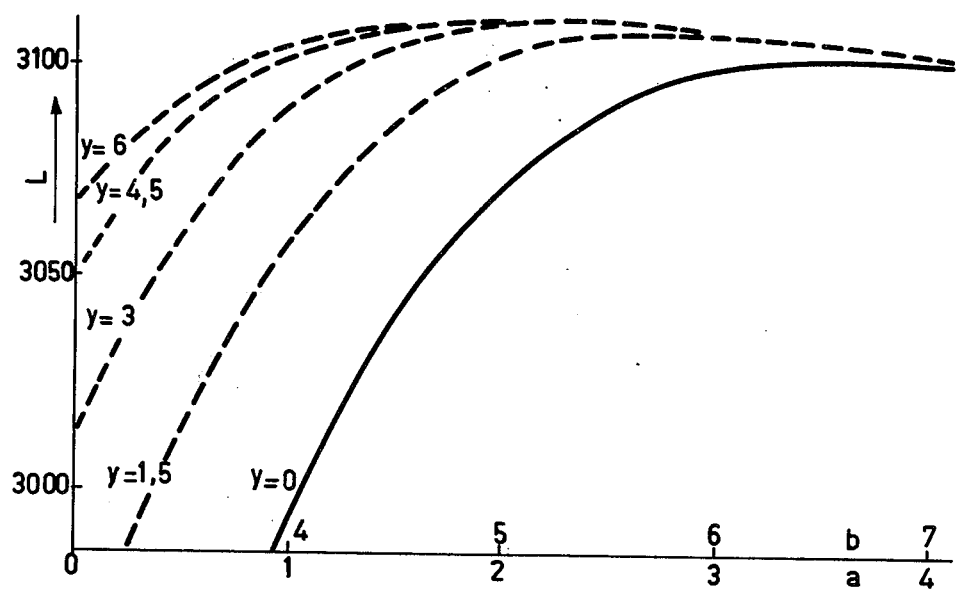

An embodiment of the invention will now be described, by way of example, with reference to the accompanying diagrammatic drawings, in which:

FIG. 1 shows schematically a 40 watt low-pressure mercury vapour discharge lamp according to the invention, and FIG. 2 is a graph in which the light outputs of various lamps according to FIG. 1 are compared.

Referring now to FIG. 1, reference numeral 1 denotes the wall of a discharge lamp having a length of about 1,200 mm and a diameter of about 38 mm. Electrodes 2 and 3 are arranged in the discharge space of this lamp. The discharge is produced by means of the electrodes in the discharge space which is filled with mercury vapour and one or more rare gases, as is usual for lamps of this type. The inner surface of the lamp wall 1 is coated with two superposed component layers 4 and 5.

As is known, with a suitable choice of voltages there is produced in the discharge space of the above described lamp a discharge which greatly emits ultraviolet radiation, in particular at a wavelength of 254 nm. This radiation excites the luminescent substances in the layers 4 and 5. Depending upon the nature of these substances the layers emit specific desired radiations which may lie in the visible part and/or in the long-wavelength ultraviolet part of the spectrum. The layers 4 and 5 include the same luminescent material or the same mixture of luminescent materials. However, in the layer 4 the luminescent material is mixed with a white material which reflects ultraviolet radiation, for example barium sulphate or calcium pyrophosphate.

FIG. 2 is a graph the abscissa of which comprises two scale graduations. The scale $a$ indicates the amount of luminescent material contained in the layer 4; the scale $b$ indicates the total amount of luminescent material in the layers 4 and 5. The light output in lumens is plotted along the ordinate.

In a known lamp provided with a single layer of luminescent material which consists of calcium halophosphate activated with manganese and antimony it was found that with a coating of about 6.5 g the maximum light output of about 3,100 lumens was obtained. If in accordance with the invention the luminescent layer is composed of two component layers (4 and 5), the layer 5 containing three grams of luminescent material and the layer 4 containing a varying amount of luminescent material mixed with barium sulphate or calcium pyrophosphate having the same mean grain size (about 4 micron), the curves shown in the graph are obtained. Near each curve the amount $y$ (in grams) of white material in the layer 4 is set out. As will be seen, this amount varies from $y = 0$ to $y = 6$. The value $y = 0$ is associated with a lamp in which the layer 4 contains no white reflecting material. The two component layers 4 and 5 then constitute a single layer. The curve shows that the light output of 3.100 lumens is obtained with about 6.5 grams. The other curves show that the same light output is obtainable using an appreciably smaller amount of luminescent material in the layer 4. This obviously results in that the total amount of luminescent material required, which is represented by the scale $b$ along the abscissa, is reduced. The Figure further shows that even higher light outputs are obtainable than without the use of white material (pigment) reflecting ultraviolet radiation. Consequently, by using the invention lamps having the same or even higher light outputs are obtainable with smaller amounts of luminescent material.

The amount of white pigment cannot be increased ad libitum, because a layer 4 of such a thickness would be obtained that insuperable difficulties of adherence would occur.

What is claimed is:

1. An electric gas discharge lamp which includes: means for producing ultraviolet radiation comprising a translucent envelope, at least two spaced discharge electrodes sealed in said envelope and an ionized gas disposed within said envelope, said lamp further comprising at least first and second superposed layers carried on said envelope, said first layer being a luminescent material, said second layer being farther from a discharge between said electrodes than said first layer, said second layer consisting of a mixture of luminescent material and a white material which is non-luminescent and has an absorption for ultraviolet radiation of a wavelength of more than 240 nm which is less than 20% of the absorption of this radiation by that constituent of the luminescent material which has the smallest absorption for this radiation, the ratio of the amount of white material to the amount of luminescent material within any one layer versus any other layer increasing with the distance from the discharge.

2. Apparatus as claimed in claim 1, wherein said white material has an absorption for ultraviolet radiation of a wavelength longer than 240 nm which is less than 10% of the absorption of this radiation by that constituent of the luminescent which has the smallest absorption for this radiation.

3. Apparatus as claimed in claim 2 wherein the converted percentage of the ultraviolet radiation incident on the luminescent component layer facing the discharge lies between 80 and 99% of the total amount of ultraviolet radiation converted by the luminescent layer.

4. Apparatus as claimed in claim 3 wherein said percentage lies between 90 and 99%.

5. Apparatus as claimed in claim 4 wherein the mean grain size of the white non-luminescent material is smaller than the mean grain size of the luminescent material.

6. Apparatus as claimed in claim 5, wherein the white non-luminescent material is barium sulphate.

7. Apparatus as claimed in claim 5 wherein the white non-luminescent material is calcium pyrophosphate.

8. Apparatus as claimed in claim 7 wherein the luminescent layer is composed of two component layers.

* * * * *